United States Patent [19]

Kitazawa et al.

[11] Patent Number: 5,332,780
[45] Date of Patent: Jul. 26, 1994

[54] COMPOSITIONS CONTAINING ALLYLFORMAMIDE COPOLYMERS

[75] Inventors: Naoki Kitazawa; Manabu Kikuta; Hiroshi Hotta; Yutaka Nakayama, all of Kyoto; Hideyuki Sumi, Osaka, all of Japan

[73] Assignee: Dai-Ichi Kogyo Seiyaku Co., Ltd., Kyoto, Japan

[21] Appl. No.: 44,591

[22] Filed: Apr. 8, 1993

[30] Foreign Application Priority Data

Apr. 10, 1992 [JP] Japan .................. 4-090582
Jul. 14, 1992 [JP] Japan .................. 4-186535

[51] Int. Cl.$^5$ .............. C08L 77/00; C08L 69/00; C08L 67/02; C08L 33/24
[52] U.S. Cl. .................. 525/64; 525/66; 525/67; 525/68; 525/71; 525/73; 525/74; 525/77; 525/133; 525/148; 525/166; 525/175; 525/179; 525/183; 525/204; 525/205; 525/208; 525/218; 525/296; 526/307.1
[58] Field of Search ........... 525/64, 66, 67, 68, 525/71, 73, 74, 77, 133, 148, 166, 175, 179, 183, 204, 205, 208, 218, 296; 526/307.1

[56] References Cited

U.S. PATENT DOCUMENTS

| | | | |
|---|---|---|---|
| 2,596,650 | 5/1952 | Caldwell | 526/307.1 |
| 4,519,929 | 5/1985 | O'Brien | 525/296 |
| 5,155,167 | 1/1992 | Pinschmidt | 525/60 |

FOREIGN PATENT DOCUMENTS

| | | |
|---|---|---|
| 418068 | 3/1991 | European Pat. Off. |
| 2-36248 | 2/1990 | Japan |
| 5-32902 | 2/1993 | Japan |

Primary Examiner—David Buttner
Attorney, Agent, or Firm—Marshall, O'Toole, Gerstein, Murray & Borun

[57] ABSTRACT

Thermoplastic resin compositions having the following component A-1 or A-2, component B and component C:

(A-1): a polymer component having a functional group capable of reacting with an amino group, or (A-2): a composition of component (A-1) and a resin that is non-reactive with an amino group and is different from the resin used in the following component B (B) a thermoplastic resin component that is non-reactive with an amino group under the conditions required to mold the entire resin composition; and (C) a graft copolymer obtained by a graft reaction of a thermoplastic polymer, with a compound (I), or a copolymer having the repeating unit (II) and the repeating unit of an ethylenic unsaturated monomer,

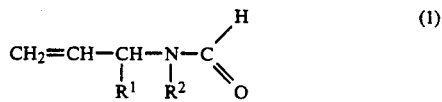

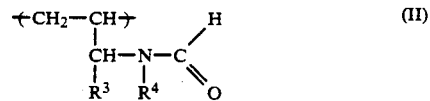

wherein $R^1$-$R^4$, the same or different represent a hydrogen atom, an alkyl group, a cycloalkyl group, an aryl group or an aralkyl group.

16 Claims, No Drawings

COMPOSITIONS CONTAINING ALLYLFORMAMIDE COPOLYMERS

FIELD OF THE INVENTION

The present invention relates to new thermoplastic resin compositions which can be used in the forms of molding sheets and films produced by injection molding and/or extrusion molding. The present invention also relates to copolymers which are added, as compatibilizing agents, to the thermoplastic resin compositions.

BACKGROUND OF THE INVENTION AND PRIOR ART

Engineering plastics, such as polyamide, polyacetal, polyphenylene ether, polybutylene terephthalate, polycarbonate and polyphenylene sulfide generally have excellent mechanical properties, such as impact resistance, and thermal properties, such as heat resistance. Nevertheless they have problems of inferior processing properties and higher production cost. Moreover, some desired properties other than mechanical and thermal ones, for instance, chemical resistance or low water absorption, may not be included in with one ore more of the above-mentioned engineering plastics.

On the other hand, polyolefinic resins being typified by polypropylene, polystyrene resins being typified by polystyrene, and acrylonitrile-butadienestyrene (ABS) resins are inferior to the engineering plastics in physical properties, such as impact resistance and heat resistance, although they are excellent in processing properties and production cost. Polystyrene resins and ABS resins are amorphous resins and are inferior in solvent resistance.

Hence, many efforts have been made to blend or alloy two engineering plastics having different properties, to blend or alloy an engineering plastic and a polyolefinic resin, and to blend or alloy a polyolefin resin and a polystyrene resin, so as to complement with each other in their weak points and to produce resin compositions having new functional properties.

Simple blending, however, of two engineering plastics, of an engineering plastic and a polyolefinic resin, or of an engineering plastic and a polystyrene resin does not work well, and the resulting resin compositions have a lower impact resistance. When such blended resin compositions are molded, the molded products have problems of inferior appearance and interlaminer cleavage.

It is well known that such resin compositions can be improved in impact resistance to some extent by adding an elastomer component. The addition, however, poses a problem of reduced rigidity of the resulting resins. The problems of interlaminer cleavage and defective appearance, when such resins are molded, have not been solved.

To solve such problems, attempts have been made to improve the compatibility of resins to be blended by using a compatibilizing agent.

For example, for polyamide resins, a graft polymer which is formed by the reaction in the extruder between a polyamide and a maleic anhydride-modified polyolefin is used as a compatibility agent (Kobunshi-Kagaku, Vol. 29, p. 259 (1972)). Moreover, a compatibilizing agent is known, which is produced by mixing and reacting this system with a multifunctional compound that can react with carboxyl groups, carboxylic anhydride groups, amino groups and other reactive functional groups, to cause partial bridging (Provisional Patent Publication No. SHO-64-31864). With the use of this compatibilizing agent, resin compositions can be improved further in heat resistance and impact resistance.

To blend polypropylene with an engineering plastic such as a polyamide, a polyester, an aromatic polyether, a polyacetal, a polycarbonate or an ABS resin, it has been proposed to improve the compatibility of the resins by using a compatibilizing agent which is prepared by reacting an unsaturated acid- or anhydride-modified polyolefin with a low molecular weight diol, a low molecular weight diamine, or a low molecular weight compound having a hydroxyl group and an amino group, or if necessary, by using said compatibilizing agent together with an addition of a thermoplastic urethane (Provisional Patent Publication No. HEI-2-36248).

The use of the above-mentioned known compatibility agents, however, has not sufficiently solved the problem of compatibility of resin blends, and the resulting resin compositions have insufficient impact resistance. When such resin compositions are molded, they have problems of defective appearance and/or interlaminer cleavage. Moreover, depending on the type of compatibilizing agent used, a new problem was experienced; the resin composition itself was colored as a result of high temperatures used during molding.

The present invention was made in view of the above-mentioned problems of the prior art. The present invention is intended to provide thermoplastic resin compositions which have excellent impact resistance and heat resistance and, when molded, present good appearance without any interlaminer cleavage. Another object of the present invention is to provide new copolymers which are added to said compositions singularly or in combination, as compatibilizing agents.

SUMMARY OF THE INVENTION

In accordance with the principals of the present invention, it has been found that when a graft copolymer, or other copolymer having a formamide functional group, is used as a compatibilizing agent, a thermoplastic resin blend composition which meets the above-mentioned objectives is produced.

The thermoplastic resin compositions of the present invention are thermoplastic resin compositions characterized in that they contain the following component A, component B and component C: (A) a polymer component having a functional group which can react with an amino group; (B) a thermoplastic resin component which is essentially non-reactive with an amino group under molding conditions used in molding the thermoplastic resin compositions into a molded article; and (C) a copolymer having one or more formamide groups.

Furthermore, the thermoplastic resin compositions of the present invention are thermoplastic resin compositions characterized in that they contain the following component A, component B and component C:

(A) a composition comprising a polymer component having a functional group which can react with an amino group and a thermoplastic resin which is essentially non-reactive with an amino group under required molding conditions and differs from the resin used in the following component B;

(B) a thermoplastic resin component which is essentially non-reactive with an amino group under required molding conditions; and (C) copolymer having one or more formamide groups.

Component A of the thermoplastic resin compositions according to the present invention may be roughly divided, as mentioned above, into two types; Component (A-1) and Component (A-2). These Components are as follows: (A-1) a polymer component having a functional group which can react with an amino group; and (A-2) a composition comprising a polymer component having a functional group which can react with an amino group and a thermoplastic resin which is essentially non-reactive with an amino group under molding conditions and differs from the resin used in component B.

The polymer components having a functional group that can react with an amino group to be used in said Component (A-1), and Component (A-2) may be divided into the following two types; Component (A-a) and Component (A-b): (A-a): A polymer component having one or more resins selected from the group consisting of a polyester resin, a polycarbonate resin, a polyamide resin and mixtures thereof; (A-b): a polymer component having one or more types of polymers having, in the molecule, a functional group selected from the group consisting of a succinic anhydride group, a carboxyl group, an epoxy group, an ester group, an amide group, a cyclic iminoether group, a cyclic iminoamino group, a halogen group, an imido group, an isocyanate group, and mixtures thereof.

As for component B of the thermoplastic resin compositions according to the present invention, a thermoplastic resin component which is essentially non-reactive with an amino group under the molding conditions used, as mentioned above. Specific examples include a polyolefinic resin, a polystyrene resin, an ABS resin a polyether resin, and mixtures thereof.

As for component C of the thermoplastic resin compositions according to the present invention, a polymer having one or more formamide groups is used, as mentioned above, said polymers are of two types, graft type and copolymer type.

The graft type component C polymers are those obtained by a graft reaction of one ore more thermoplastic polymers with formamide compound (I) expressed by the following chemical formula (I).

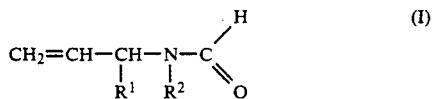

wherein, $R^1$ and $R^2$, the same or different, represent a hydrogen atom, an alkyl group with 1 to 8 carbon atoms, a cycloalkyl group with 6 to 10 carbon atoms, an aryl group with 6 to 10 carbon atoms, or an aralkyl group with 6 to 10 carbon atoms.) The copolymers have, in the molecule, the formamide repeating unit (II), expressed by the following formula, and repeating units of an unsaturated olefinic monomer.

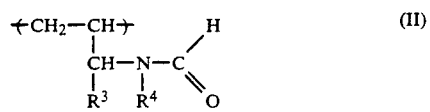

wherein $R^3$ and $R^4$, the same or different, represent a hydrogen atom, an alkyl group with 1 to 8 carbon atoms, a cycloalkyl group with 6 to 10 carbon atoms, an aryl group with 6 to 10 carbon atoms, or an aralkyl group with 6 to 10 carbon atoms.

In the following, the respective components of the thermoplastic resin compositions according to the present invention will be described in more detail.

(1) Component A

As described above, component A of the thermoplastic resin compositions according to the present invention may be roughly divided into the following two types; Component (A-1) and Component (A-2): (A-1): a polymer component having a functional group capable of reacting with an amino group; (A-2): A composition comprising a polymer component having a functional group capable of reacting with an amino group and a thermoplastic resin which is essentially non-reactive with an amino group, under the molding conditions used, and differs from the resin used in component B.

The polymer components having a functional group that can react with an amino group to be used in said Component (A-1) and Component (A-2) may be divided into the two types; Component (A-a) and Component (A-b): Component (A-a) is a polymer component having a bond group, in the main chain, that can react with an amino group (main chain reaction type). Such bond, groups include an ester bond, a carbonic ester bond, an amide bond, a urethane bond and an imide bond. Specific examples of Component (A-a) include a polyester resin, a polycarbonate resin and a polyamide resin. One or more types of such resins are used as Component (A-a).

When explained in more detail, a polyester resin of Component (A-a) is not limited to any one type; various types of polyester resins may be used. For example, both aliphatic and aromatic polyester resins may be used. When physical properties are considered, the aromatic polyester resins are preferable. The molecular weight may be selected according to the intended application, and the like. The intrinsic viscosity is normally from 0.2 to 2.0 dL/g, and preferably from 0.5 to 1.2 dL/g. The polyester resins may have carboxylic acid terminal groups and/or alcoholic hydroxyl terminal groups, and the ratio is not particularly limited, but 9/1 to 1/9 is preferable.

Such polyester resins may be produced by a variety of known methods, and many types of polyester resins can be used. Specific examples of polyester resins of Component (A-a) include polyethylene terephthalate (PET), polybutylene terephthalate (PBT), polycyclohexadimethyl terephthalate (PCT), a polycondensed polymer of bisphenol A and phthalic acid, and mixtures thereof.

The polycarbonate resins of Component (A-a) may be both aliphatic and aromatic polycarbonates. Examples of such polycarbonates include polymers and copolymers comprising bisphenols such as 2,2-bis(4-oxyphenyl)alkane, bis(4-oxyphenyl)ether, and bis(4-oxyphenyl)sulfone, bis (4-oxyphenyl)sulfide and bis(4-oxyphenyl)sulfoxide.

The polyamide resins of Component (A-a) are not limited to any specific kind. Various kinds of polyamide resins may be used. Both aliphatic and aromatic polyamide resins may be used. The molecular weight is not particularly limited. When the processing property and other physical properties of resulting moldings are considered, the number average molecular weight (Mn) is from about 4,000 to about 50,000, and preferably from about 5,000 to about 30,000.

Such polyamide resins may be produced by a variety of known methods. For instance, they may be produced by (co)polymerization or (co)polycondensation, by ring-opening of lactams having three or more rings; polymerizable omega-amino acids; reaction products of a dibasic acid and a diamine; and mixtures.

The polyamide resin of Component (A-a) may be of many kinds. Specific examples include aliphatic polyamides such as nylon 6, nylon 6,6, nylon 6,10, nylon 11, nylon 12, nylon 6,12 and nylon 4,6, aliphatic copolymer polyamides such as nylon 6/6, nylon 6/6,10, and nylon 6/6,12; and aromatic polyamides, such as polyhexamethylenediamine terephthalamide, polyhexamethylenediamine isophthalamide, and polyamides having xylene groups. Moreover, polyesteramides and polyesteretheramides may be used. Of these, preferable polyamide resins are nylon 6 and nylon 6,6.

The other Component (A-b), being a polymer component having a functional group that can react with amino acid, is a polymer component having a functional group, on a side chain or on a molecule end of the polymer, that can react with an amino acid (side chain or terminal reaction type). Examples of such functional groups include one or more succinic anhydride groups, carboxyl groups, epoxy groups, ester groups, amide groups, cyclic iminoether groups, cyclic iminoamino groups, halogen groups, imido groups and isocyanate groups. Of these groups, the most important and preferable functional groups are succinic anhydride groups, carboxyl groups, epoxy groups and cyclic iminoether groups. Component (A-b) may contain one or two or more different polymers wherein at least one of the polymers includes one or more of the above-mentioned functional groups.

When explained in more detail, a polymer having a succinic anhydride group in the side chain, as Component (A-b), may be obtained by copolymerizing maleic anhydride or itaconic anhydride with an ethylenically unsaturated monomer, or by making a graft copolymer from a polymer, such as a polyolefin, with maleic anhydride or with itaconic anhydride in the presence of a radical polymerization initiator. Specific examples include a styrene-maleic anhydride copolymer, an isobutylene-maleic anhydride copolymer, and an ethylene-maleic anhydride copolymer. Furthermore, specific examples include one or more polymers graft-reacted with maleic anhydride; such polymers include polyethylene, polypropylene, SEBS (hydrogenated styrene-butadiene-styrene block copolymers), ethylene-propylene rubber, EPDM (ethylene-propylene-diene copolymers), styrene-isoprene copolymers, and polyphenylene ether.

A polymer having a carboxyl group in the side chain, as Component (A-b), may be obtained by copolymerizing an ethylenically unsaturated carboxylic acid, such as acrylic acid, or methacrylic acid with an unsaturated ethylenic monomer, or by making graft copolymers from a polymer, such as a polyolefin, with an unsaturated monomer having a carboxylic acid group. Specific examples include styrene-acrylic acid copolymers, ethylene-methacrylic acid copolymer, and ethylene-maleic anhydride-acrylic acid copolymers. Further specific examples include polymers graft-reacted with acrylic acid or with methacrylic acid; examples of such polymers include polystyrene, polypropylene, SEBS (hydrogenated styrene-butadienestyrene block copolymer), and ethylene-propylene rubber.

A polymer having an epoxy group in the side chain, as Component (A-b), may be, for example, a copolymer of glycidyl acrylate or glycidyl methacrylate with an unsaturated ethylenic monomer. Typical examples include an ethylene-glycidyl methacrylate copolymer, a propylene-glycidyl methacrylate copolymer, and a styrene-glycidyl methacrylate copolymer.

A polymer having one or more ester groups in the side chain, as Component (A-b), may be, for example, a copolymer of an ester-group-containing ethylenically unsaturated monomer, such as an acrylic acid alkyl ester, a methacrylic acid alkyl ester, and an alkylvinyl ester, with another ethylenic unsaturated monomer. Specific examples include ethylene-acrylic acid ester copolymers, ethylene-methacrylic acid ester copolymers, and ethylene-vinyl acetate copolymers.

A polymer having an amide group in the side chain, as Component (A-b), may be, for example, a copolymer of acrylamide, methacrylamide, N-methylacrylamide, N-methylmethacrylamide, N,N-dimethylacrylamide, or N,N-dimethylmethacrylamide with another unsaturated ethylenic monomer.

A polymer having one or more cyclic iminoether groups in the side chain, as Component (A-b), may be, for example, a copolymer of 2-vinyloxazoline or 2-vinyloxazine with another ethylenic monomer. A typical example is a styrene-2-vinyloxazoline copolymer.

A polymer having one or more cyclic iminoamino groups in the side chain, as Component (A-b), may be, for example, a copolymer of 2-vinylimidazoline with another ethylenically unsaturated monomer.

Specific examples of a polymer having one or more halogen groups in the side chain, as Component (A-b), include polyvinyl chloride, a chlorinated polyolefin, a chloroethylvinyl ether copolymer, and chloromethylated polystyrene.

Specific examples of a polymer having one or more imido groups in the side chain, as Component (A-b), include copolymers of N-phenylmaleimide or N-alkylmaleimide with another ethylenic unsaturated monomer.

A polymer having one or two terminal carboxyl groups as Component (A-b), may be, for example, a polymer including a carboxyl group in one terminal position obtained by radical polymerization using such a radical polymerization initiator having a carboxyl group, and, if necessary, with a chain transfer agent having one or more carboxyl groups.

Specific examples include terminal carboxypolystyrene, terminal carboxypolyisoprene, terminal carboxypolyacrylic acid esters, and terminal carboxy-polymethacryl acid esters. Furthermore, examples of a polymer having carboxyl group at a terminal location in the molecule include terminal carboxypolyesters and terminal carboxypolyamides which are obtained from polycondensation in the presence of excess dicarbonic acid.

A polymer having an epoxy group or an ester group at one or both terminal positions of the molecule, as Component (A-b), may be, for example, polystyrene with a terminal ester group or a terminal epoxy group, which is obtained by esterification of the above-mentioned terminal carboxypolystyrene by means of lower alcohol or glycidol.

Component (A-2), which is used as component A of the thermoplastic resin compositions according to the present invention, is a composition, as mentioned before, comprising a polymer component having a functional group that can react with an amino group (A-a) or (A-b) and a thermoplastic resin that virtually does not react with an amino group, e.g. amino acid, under the molding conditions.

The above-mentioned thermoplastic resin, which virtually does not react with an amino acid under the molding conditions, belongs to a category of thermoplastic resins of component B as will be explained in more detail hereinafter, but is different from the resin used as component B of the thermoplastic resin composition having this Component (A-2). It is desirable that the above-mentioned thermoplastic resin has good compatibility or affinity with Component (A-a) or (A-b).

The blending ratio of the above-mentioned thermoplastic resin which virtually does not react with an amino group of Component (A-a) or (A-b) in Component (A-2), under the molding conditions, is from 99 parts/1 part to 50 parts/50 parts, and preferably from 97 parts/3 parts to 60 parts/40 parts.

When the above-mentioned blending ratio is greater than 99/1, the compatibility of the resulting thermoplastic resin composition will not be sufficient. When the above-mentioned blending ratio is smaller than 50/50, the resulting thermoplastic resin composition will have economic disadvantages. Moreover, its mechanical properties may be inferior.

(2) Component B

As mentioned before, component B of the thermoplastic resin compositions according to the present invention is a thermoplastic resin component which virtually does not react with an amino group under the molding conditions. Specific examples of such thermoplastic resin components include a polyolefinic resin, a polystyrene resin, an ABS resin and a polyether resin, and one or more of such resins are used as component B.

When explained in more detail, the polyolefinic resins of component B include polyolefins and their oligomers, polyolefinic elastomers, polyolefin thermoplastic elastomers, ethylene-vinylester copolymers, and ethylene-acrylester copolymers, and includes blends of such polyolefinic resins and copolymers thereof.

Specific examples of polyolefinic resins of component B include homopolymers, such as polyethylene (linear low density polyethylene (LLDPE), low density polyethylene (LDPE), very low density polyethylene (VLDPE), medium density polyethylene, high density polyethylene (HDPE), and the like), polypropylene, polybutene and polyisobutene; ethylene-alpha-olefin copolymers, such as ethylene-propylene copolymers, ethylene-propylene copolymers of low crystallinity, ethylene-propylene copolymer rubber (EPR), ethylene-butene copolymers (EBM), ethylene-propylene-diene copolymers (EPDM), ethylene-propylene-butene copolymers and ethylene-butylene copolymers; copolymers of propylene and other alpha-olefins, such as propylene-butene copolymers; and polyolefin thermoplastic elastomers mainly comprising blends of various ethylene copolymers [ethylene-vinyl acetate copolymers (EVA), ethylene-vinyl alcohol copolymers (EVOH), ethylene-alkylacrylate copolymers, ethylene-alkylmethacrylate copolymers, and the like, poly(4-methyl-1-pentene), butyl rubber, butadiene rubber, polypropylene and ethylene-propylene rubber, and their mixtures. Copolymers in this context include random copolymers, block copolymers, random block copolymers and graft copolymers.

Of such polyolefinic resins, it is desirable to use polypropylene, polyethylene, ethylene-propylene rubber and EPDM. Their average molecular weights are, for example from 5,000 to 300,000, and preferably from 10,000 to 200,000.

Polystyrene resins of component B include homopolymers or copolymers of styrene, alpha-methylstyrene and p-methylstyrene. Specific examples include general purpose polystyrene (GPPS), high impact polystyrene (HIPS), and so-called styrene thermoplastic elastomers such as SEBS resin (hydrogenated styrene-butadiene-styrene block copolymer), SEPS resin (hydrogenated styrene-isoprene-styrene block copolymer) and SEP resin (hydrogenated styrene-isoprene block copolymer).

Of such polystyrene resins, it is desirable to use general purpose polystyrene (GPPS) and high impact polystyrene (HIPS). Their average molecular weights, for example, are from 20,000 to 300,000, and preferably from 30,000 to 200,000.

The types of ABS resins of component B are not particularly limited, and those produced by the graft method and the polymer blend method may be used. Furthermore, AS resin (acrylonitrile-styrene resin) and AES resin (acrylonitrile-EPDM-styrene resin) may be used. ABS resin, however, is preferable.

Polyether resins of component B include many kinds. For instance, they may be roughly divided into polyacetal homopolymers such as polyoxymethylene (POM), polyacetal copolymers with mixture of polyether structure, such as trioxane-ethylene oxide copolymer, polyphenylene ether (PPE), polyether sulfone (PES), mixing ether groups and sulfone groups, polyether ketone (PEK), mixing ether groups and carbonyl groups, polyphenylene sulfide (PPS) having thioether groups, and polysulfone (PSO). Of these, it is desirable to use polyacetal (polyoxymethylene (POM)) and polyphenylene ether (PPE).

The above-mentioned polyphenylene ether includes compositions into which polystyrene is blended for better moldability.

(3) Component C

As mentioned above, polymers having one or more formamide groups are used as component C (compatibilizing agent) of the thermoplastic resin compositions according to the present invention. Said polymers are of two types; graft type and copolymer type. These respective types of polymers will be explained in more detail.

Graft Type

The graft copolymers having one or more formamide groups used as component C of the thermoplastic resin compositions according to the present invention are graft copolymers which are obtained from graft polymerization, by a known method, of a thermoplastic polymer with a formamide compound (I).

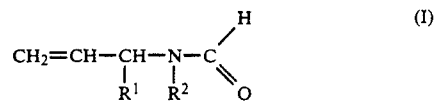

In chemical formula (I), $R^1$ and $R^2$ independently (same or different) represent a hydrogen atom, an alkyl group with 1 to 8 carbon atoms, a cycloalkyl group with 6 to 10 carbon atoms, an aryl group with 6 to 10 carbon atoms, or an aralkyl group with 6 to 10 carbon atoms.

The graft copolymers are produced by reacting a thermoplastic polymer having a weight average molecular weight of about 5,000 to about 500,000 with a formamide compound (I) (allylformamide derivative) in the presence of a catalyst for free radical generation at a temperature sufficient to generate free radicals up to about 250° C.

The above-mentioned thermoplastic polymer which is subjected to graft reaction with the formamide compound (I) is compatible to or has affinity for the thermoplastic resin component of component B and for the thermoplastic resin in Component (A-2) which virtually does not react with amino groups under the molding conditions.

With regard to such thermoplastic polymers, thermoplastic polymers having affinity for polyolefin resins include polyolefins and their oligomers, polyolefin elastomers and their oligomers, ethylene-vinylether copolymers and their oligomers, ethylene-acrylether copolymers and their oligomers, as well as the blends of such polyolefins with or without their oligomers.

When explained in more detail, the above-mentioned polyolefins include high density polyethylene, medium density polyethylene, low density polyethylene, polypropylene, polybutene, poly-4-methylpentene-1, and copolymers of ethylene and alpha-olefins. The above-mentioned polyolefin elastomers include ethylene-propylene rubber, ethylene-propylene-diene copolymers (EPDM), ethylene-vinyl acetate copolymers (EVA), butyl rubber, butadiene rubber, amorphous ethylene-propylene copolymers, propylene-butene copolymers, their oligomers, and mixtures thereof. Moreover, they include polyolefin thermoplastic elastomers mainly comprising blends of polypropylene and ethylene-propylene rubber. Of the olefin polymers and olefin copolymers mentioned above, it is desirable to use polypropylene, ethylene-propylene rubber, EPDM and their oligomers.

The thermoplastic polymers having affinity for polystyrene resins, ABS resins and polyether resins are suitably provided by thermoplastic polymers having one or more aromatic groups in the molecule, such as polystyrene, styrene-alpha-methylstyrene copolymers, styrene-p-methylstyrene copolymers, styrene-butadiene copolymers and their hydrides, SEBS, styrene-isoprene copolymers and their hydrides, SEPS, polyphenylene ether and polyphenylene sulfide, and mixtures thereof. Of these polymers, it is desirable to use SEBS, SEPS and polyphenylene ether.

On the other hand, the above-mentioned formamide compound (I), which is used as the graft monomer in the production of the graft copolymer of component C may be provided by N-alkenylformamide compounds and N-alkyl-N-alkenylformamide compounds.

When explained in more detail, the above-mentioned N-alkenylformamide compounds include N-allylformamide, N-(1-methyl- 2-propenyl)formamide, N-(1-ethyl-2-propenyl)formamide, N-(1-n-propyl-2-propenyl)formamide, N-(1-n-2-butyl-2-propenyl)formamide, N-(1-n-hexyl-2-propenyl)formamide, N-(1-cyclohexyl-2-propenyl)formamide, and N-(1-benzyl-2-propenyl)formamide. The above-mentioned N-alkyl-N-alkenylformamide compounds include N-methyl-N-allylformamide, N-methyl-N-(1-methyl-2-propenyl)formamide, N-ethyl-N-allylformamide, N-ethyl-N-(1-methyl-2-propenyl)formamide, N-propyl-N-(1-benzyl-2-propenyl)formamide, N-butyl-N-(1-cyclohexyl-2-propenyl)formamide, N-hexyl-N-(1-n-hexyl-2-propenyl)formamide, N-octyl-N-(1-n-butyl-2-propenyl)formamide, N-benzyl-N-allylformamide, and N-cyclohexyl-N-allylformamide, and mixtures thereof.

Of these, it is preferable to use N-allylformamide, N-(1-methyl-2-propenyl)formamide, N-methyl-N-allylformamide, N-methyl-N-(1-methyl-2-propenyl)formamide, N-ethyl-N-allylformamide, and N-ethyl-N-(1-methyl-2-propenyl)formamide, and mixtures thereof.

The above-mentioned formamide compounds (I) are used in the form of a mixture with a small quantity of a catalyst for free radical generation, and are grafted to the thermoplastic polymer by heating the reaction mixture to a temperature which is sufficient to promote the graft reaction at an appropriate speed, yet not so high to cause destructive decomposition of the reacting species or reaction products.

The graft reaction is catalyzed by using a catalyst for free radical generation such as peroxides, dialkyl-, diacyl-, alkyl-acyl peroxides or azo compounds at an appropriate range of temperature, and the graft reaction is externally initiated by cocatalysts such as a metal salt or complex or by irradiation of light.

Typical examples of the above-mentioned catalysts for free radical generation include di-t-butyl peroxide, dicumyl peroxide, t-butyl perbenzoate, benzoyl peroxide, cyclohexanone peroxide, docecyl peroxide, azobisisobutyronitrile and the like, and their mixtures. Of these catalysts, it is desirable to use di-t-butyl peroxide, dicumyl peroxide and their mixtures.

As for the quantity of the above-mentioned catalysts for free radical generation, it is sufficient to provide a quantity which is adequate as a catalyst, and the effective range is from about 1 to about 200 grams per kilogram of thermoplastic polymer, and the preferable range is from about 1 to about 100 grams of catalyst per kilogram of thermoplastic polymer. The catalyst may be entirely added at the beginning of the graft reaction, or it may be added little by little as the reaction proceeds.

The above-mentioned thermoplastic copolymer is stirred in the mixture containing the formamide compound (I) and the catalyst for free radical generation at an appropriate reaction temperature. The useful reaction temperature depends on the particular catalyst used, but is in the range of from room temperature to about 250° C. When di-t-butyl peroxide or dicumyl peroxide is used as the catalyst, the preferable reaction temperature range is from about 100 to about 200° C.

When the weight average molecular weight exceeds about 2,000, the above-mentioned thermoplastic polymers generally become very viscous. Then it may be difficult to stir or the reaction mixture may look like rubber. In such a case, it is preferable to carry out the reaction in an inert solvent. Useful solvents include nonane, decane and similar aliphatic hydrocarbons, and chlorobenzene, dichlorobenzene, dichlorotoluene and similar chlorinated hydrocarbons.

Of the formamide compound graft copolymers thus obtained, those suitably used according to the present invention are graft copolymers which are obtained from a graft reaction between a thermoplastic polymer, which is selected from polyolefins or olefinic copolymers, such as polypropylene, polyethylene, ethylene-propylene copolymers and ethylene-propylene rubber, SEBS, SEPS and polyphenylene ether; and N-allylformamide, N-(1-methyl-2-propenyl)formamide, N-methyl-N-allylformamide or N-methyl-N-(1-methyl-2-propenyl)formamide.

The quantity of the formamide compound (I) to be grafted in the graft copolymer of component C cannot be determined unconditionally since it depends on the desired physical properties and appearance of the thermoplastic resin composition to be produced. It, however, is normally sufficient to graft react about 0.05 to about 20 parts by weight of the formamide compound (I) to 100 parts by weight of the thermoplastic polymer, being the raw material of component C, and preferably reacting about 0.2 to about 10 parts by weight of the formamide component (I). When the quantity of formamide compound (I) to be grafted is less than about 0.05 part by weight, the resins in the final thermoplastic resin compositions may have insufficient compatibility to each other. When the quantity to be grafted exceeds about 20 parts by weight, it may be uneconomical to produce the thermoplastic resin compositions or the physical properties of the resulting resin compositions may be inferior.

Copolymerization Type

The copolymers having one or more formamide groups used as component C of the thermoplastic resin compositions according to the present invention are copolymers which have the formamide repeating unit (II) expressed by the following formula and the repeating unit of the ethylenic monomer in the molecule.

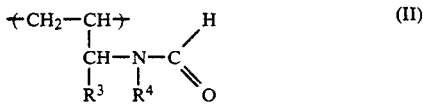

wherein $R^3$ and $R^4$, same or different, represent a hydrogen atom, an alkyl group with 1 to 8 carbon atoms, a cycloalkyl group with 6 to 10 carbon atoms, an aryl group with 6 to 10 carbon atoms, or an aralkyl group with 6 to 10 carbon atoms.

The copolymers having the formamide group are produced by a known method, for example, by radical polymerization, ionic polymerization or coordination polymerization of the ethylenic unsaturated monomer and the formamide compound (monomer).

The above-mentioned ethylenic unsaturated monomers, which are used as the raw materials for the co-polymer of component C, are monomers which can be copolymerized with the above-mentioned formamide compounds. Specific examples include aromatic unsaturated monomers, such as styrene, alpha-methylstyrene and p-methylstyrene; alpha-olefins such as ethylene, propylene, 1-butane, 1-hexene, 1-octane and 1-dodecene; vinyl esters such as vinyl acetate and vinyl propionate; and acrylic acid esters or methacrylic acid esters such as ethylacrylate, propylacrylate and methylmethacrylate.

Of these, the preferable monomers are styrene and alpha-olefins. On the other hand, the above-mentioned formamide compound, which is copolymerized with one or more ethylene unsaturated monomers in the production of the copolymer of component C, may be provided by N-alkenylformamide compounds, N-alkyl-N-alkenylformamide compounds, and mixtures thereof.

When explained in more detail, the above mentioned alkenylformamide compounds include N-allylformamide, N-(1-methyl-2-propenyl)formamide, N-(1-ethyl-2-propenyl)formamide, N-(1-n- propyl-2-propenyl)formamide, N-(1-n-butyl-2-propenyl)formamide, N-(1-n-hexyl-2-propenyl)formamide, N-(1-cyclohexyl-2-propenyl)formamide, and N-(1-benzyl-2-propenyl)formamide. The above-mentioned N-alkyl-N-alkenylformamide compounds include N-methyl-N-allylformamide, N-methyl-N-(1-methyl-2-propenyl)formamide, N-ethyl-N-allylformamide, N-ethyl-N-(1- methyl-2-propenyl)formamide, N-propyl-N-(1-benzyl-2-propenyl)formamide, N-butyl-N-(1-cyclohexyl-2-propenyl)formamide, N-hexyl-N-(1-n-hexyl-2-propenyl)formamide, N-octyl-N-(1-n-butyl-2-propenyl)formamide, N-benzyl-N-allylformamide, N-cyclohexyl-N-allylformamide, and mixtures thereof.

Of these, it is preferable to use N-allylformamide, N-(1-methyl-2-propenyl)formamide, N-methyl-N-allylformamide, N-methyl-N-(1-methyl-2-propenyl)formamide, N-ethyl-N-allylformamide, N-ethyl-N-(1-methyl-2-propenyl)formamide and mixtures thereof.

When the above-mentioned formamide compounds and ethylenic unsaturated monomers are copolymerized, copolymers having one or more formamide groups of component C will be obtained. Such copolymers are addition polymers which are produced, for example, by solution polymerization, emulsion polymerization, precipitation polymerization, suspension polymerization or bulk polymerization.

The method used to achieve the copolymerization reactions are not particularly critical. It, however, will be convenient to use the radical copolymerization method which utilizes a free radical generating catalyst, such as one or more peroxides and/or azo compounds in an adequate temperature range, or a Ziegler-Natta method which utilizes ionic polymerization catalysts of titanium trichloride and triethylaluminum.

The free radical generating catalysts to be used in the radical copolymerization method include benzoyl peroxide, t-butylbenzoate, cyclohexane peroxide, azobisisobutyronitrile and the like, and their mixtures. Regarding the quantity of the free radical generation catalysts, it is sufficient to provide a quantity which is adequate to catalyze the reaction and the effective range is from about 0.1 to about 5.0% by weight relative to the monomers. The reaction temperature must be high enough to allow the catalyst to generate the necessary number of free radicals. The useful temperature range depends on the kind of the catalyst used, and is from room temperature to about 150° C.

The ionic polymerization catalysts to be used in the Ziegler-Natta method include titanium tetrachloride and triethylaluminum; titanium trichloride and triethylaluminum; and combinations of alkylates of various metals of Groups 1, 2 and 3 and transition metal compounds of Groups 4-7.

The reaction solvents to be used in such copolymerization reactions are preferably inert ones, and specific examples include heptane, octane, benzene, toluene, xylene and chlorobenzene.

The composing ratio of the respective constitutional repeating units of the copolymers having one or more formamide groups of component C can be determined by measuring their infrared absorption spectrum. The composing ratio of the respective repeating units can be determined by comparing the ratio of the absorbance within the absorption band of 1450-1500 cm$^{-1}$ or 710-730 cm$^{-1}$ that are unique to the repeating unit of the unsaturated ethylenic monomer and the absorbance within the absorption band of 1650–1700 cm$^{-1}$ that is unique to the formamide repeating unit (II).

The copolymers having one or more formamide groups of component C contain the repeating units of, for example, the ethylene unsaturated monomer comprising about 80 to about 99.95% by weight of the molecule, and preferably about 90 to 99.8% by weight. The formamide repeating units (II) are contained in the molecule in an amount of about 0.05 to about 20% by weight of the molecule, and preferably about 0.2 to about 10% by weight.

When the content of the formamide repeating unit (II) in the above-mentioned copolymers is less than about 0.05% by weight, the compatibility of the resins in the final thermoplastic resin compositions is inferior. When the content exceeds about 20% by weight, the copolymerizability of the formamide compounds is not so high, and it is not economical to produce the copolymers. Hence the production of the thermoplastic resin composition is not economical, and the physical properties of the resin compositions may be deteriorated.

(4) Ratio of Components of Thermoplastic Resin Compositions

The thermoplastic resin compositions according to the present invention have essential components; component A, component B and component C, described above. When necessary, other additives may be added (e.g., reinforcements, such as glass fiber and carbon fiber, inorganic fillers, thermal stabilizers, antistatic agents, antioxidants, light stabilizers, fire retarding agents, and weather resistance agents).

Regarding the mixing ratios of the above-mentioned components A, B and C of the thermoplastic resin compositions according to the present invention, when the total of components A and B is 100 parts by weight, component A is from about 5 to about 95 parts by weight, and preferably from about 20 to about 95 parts by weight, and component B is from about 95 to about 5 parts by weight, and preferably from about 80 to about 5 parts by weight. When the mixing ratio of component A and component B is out of the ranges described above, the resulting resin compositions will have one or more deficiencies, such as lower mechanical strength, including rigidity, and degraded moldability.

When the total of component A and component B is 100 parts by weight, the content of component C mixed is from about 0.05 to about 20 parts by weight, and preferably from about 0.5 to about 10 parts by weight. When the content of component C is less than about 0.05 part by weight, the compatibility of the resins of component A and of component B is not adequate, and the respective physical properties of the resulting resin compositions are not improved adequately. When the content of component C exceeds about 20 parts by weight, the improvements in the respective physical properties are not proportional to the content of component C, and the impact strength of the resin compositions tend to deteriorate. Moreover, it is not economically disadvantageous in the production of resin compositions.

5. On Methods of Producing Thermoplastic Resin Compositions

The order of adding the above-mentioned components A, B and C, the timing of adding such components, and the adding methods are not particularly restricted in the production of the thermoplastic resin compositions according to the present invention.

As the most simple example, all components A, B and C may be heated and melted simultaneously. First, component A and component B may be melted and kneaded together, then component B may be added to the mixture, and the mixture may be melted and kneaded. A variety of combinations of the addition orders, timings and methods may be employed.

With regard to the specific method of producing the thermoplastic resin components according to the present invention, kneading machines such as single-screw extruders, double-screw extruders, Banbury mixers and kneading rollers or mixers, such as a Henschel mixer, may be used to knead the above-mentioned respective components under heated and melted conditions. The kneading temperature depends on the components to be used, the mixed quantities, and physical properties of the resin composition to be produced, and can not be determined unconditionally. The kneading temperature, however, is normally selected within a range from about 180 to about 340° C.

In the thermoplastic resin compositions according to the present invention, component C (graft copolymers or copolymers having one or more formamide groups) has an action of increasing the compatibility of component A (Component (A-1) or Component (A-2)) and component B (thermoplastic resin component which virtually does not react with amino groups). The mechanism of increased A-B comparability is estimated by considering the polymer structure of component C as follows: First, the formamide group portion of component C is decomposed by the action of heat during kneading and changed into amino groups. Next, the amino groups act to combine component C and component A through chemical reactions, such as amidation, esterification, transesterification, or transamidation with a functional group of component A, said functional group being able to react with an amino group. As a result, a compatibilizing agent is formed, and this compatibilizing agent presumably improves the compatibility of the resins of component A and of component B.

It is estimated that various physical properties, including impact resistance of the thermoplastic resin compositions, according to the present invention were improved by the enhanced compatibility of the resins of component A and of component B.

According to the present invention, the compatibility of engineering plastics, or the compatibility of an engineering plastic and a polyolefinic resin, polystyrene resin, and the like, are enhanced by the use of graft copolymers or copolymers having one or more formamide groups as a compatibilizing agent (component C), and because of it, the thermoplastic resin compositions according to the present invention have the following remarkable merits:

(1) Thermoplastic resin compositions with excellent impact resistance are produced;
(2) Thermoplastic resin compositions, which can be molded into moldings with good appearance without any interlaminar cleavage, are produced;
(3) Thermoplastic resin compositions, which can be molded at high temperature to produce moldings of good hue without any coloring, are produced.

EXAMPLES

Some embodiments of the present invention will be described in the following examples, but it should be noted that the present invention is not limited by any of these embodiments.

Graft Type

Some embodiments using graft copolymers having formamide group as component C (compatibilizing agent) of the thermoplastic resin compositions will be explained.

Polymer (1)

Graft Copolymer Having Formamide Group 2.0 g of N-allylformamide (graft monomer) and 40 g of ethylene-propylene rubber (ethylene/propylene =6/4) (raw material polymer having a weight average molecular weight of 50,000) were dissolved in 160 g of chlorobenzene. 0.5 g of dicumyl peroxide was dissolved into 40 g of chlorobenzene and the solution was added dropwise to the former solution at a temperature of 128° C. After completion of the dropwise addition of dicumyl peroxide, the reaction was allowed to continue for three hours, and the reacting mixture was put into methanol to remove nonreacted N-allylformamide. The resulting mixture was dried to obtain ethylene-propylene rubber grafted by N-allylformamide (polymer (1)). The infrared absorption spectrum of the obtained graft product was measured. According to the absorption around 1660 cm$^{-1}$ (due to amide) and the absorption around 720 cm$^{-1}$ (due to alkyl group of ethylene-propylene rubber), the quantity of N-allylformamide grafted was determined to be 2.7 weight percent relative to 100 weight percent of ethylene-propylene rubber.

Copolymers (2)–(8)

Other graft copolymers having one or more formamide groups (copolymers (2)–(8)) were prepared by methods similar to that of the above-mentioned copolymer (1). The results are shown in Table 1. Table 1 shows the raw material polymers, graft monomers and their grafted quantities of the copolymers (1)–(8). In Table 1, Mw indicates weight-average molecular weight, and Mn indicates number-average molecular weight.

TABLE 1

GRAFT COPOLYMERS HAVING FORMAMIDE GROUP

| | Kind of raw material polymer | Graft monomer | Weight % of graft |
|---|---|---|---|
| Polymer (1) | Ethylene-propylene rubber (mole ratio = 6/4, Mw = 50,000, Mn = 30,000) | N-allylformamide | 2.7 |
| Polymer (2) | Polypropylene (Mw = 60,000, Mn = 24,000) | N-allylformamide | 4.6 |
| Polymer (3) | Ethylene-propylene copolymer (mole ratio = 1/1, Mw = 11,800, Mn = 6,600) | N-allylformamide | 10.0 |
| Polymer (4) | Polyethylene (Mw = 5,000, Mn = 2,200) | N-(1-methyl-2-propenyl)formamide | 5 |
| Polymer (5) | Ethylene-propylene rubber (mole ratio = 6/4, Mw = 50,000, Mn = 30,000) | N-ethyl-N-allylformamide | 1.8 |
| Polymer (6) | Hydrogenated styrene-butadiene copolymer (mole ratio = 3/7, Mw = 50,000, Mn = 48,000) | N-methyl-N-(1-methyl-2-propenyl)formamide | 0.5 |
| Polymer (7) | Hydrogenated styrene-butadiene copolymer (mole ratio = 3/7, Mw = 50,000, Mn = 48,000) | N-methyl-N-allylformamide | 2.3 |
| Polymer (8) | Polyphenylene ether (Mw = 30,000, Mn = 18,000) | N-ethyl-N-(1-methyl-2-propenyl)formamide | 1.5 |

Embodiments 1–15

Component (A-a) for component A was provided by those listed in Table 2. Component (A-b) for component A was provided by those listed in Table 3. Component B was provided by those listed in Table 4. Component C (graft copolymer) was provided by the above-mentioned copolymers (1) through (8). Table 2 and Table 4 list the name, abbreviation, trade name, and manufacturer of each resin. Table 3 lists the polymer type, abbreviation, and functional group of each resin. Mw indicates weight-average molecular weight, and Mn indicates number-average molecular weight.

TABLE 2

COMPONENT (A-a)

| Abbreviation | Resin name | Trade name | Manufacturer |
|---|---|---|---|
| PET | Polyethylene terephthalate | Dianite PA500 | Mitsubishi Rayon Co., Ltd. |
| PET | Polybutylene terephthalate | Juranex 2002 | Polyplastics Co., Ltd. |
| PC | Polycarbonate | Taflon A2500 | Idemitsu Sekiyu Kagaku Co., Ltd. |
| PA | Polyamide-6 | Leona 1300S | Asahi Chemical Industry Co., Ltd. |

TABLE 3

COMPONENT (A-b)

| Abbreviation | Resin name | Kind of functional group |
|---|---|---|
| PP-MAH | Maleic-anhydride-grafted polypropylene (maleic anhydride content: 1.0 weight %, Mw = 73,000, Mn = 34,000) | Succinic anhydride group |
| PA-COOH | Polyamide-6,6 with carboxyl group terminal (Mw = 60,000, Mn = 32,000) | Carboxyl group |
| E-GMA | Ethylene-glycidyl methacrylate copolymer (mole ratio - 98/2, Mw = 58,000, Mn = 28,000) | Epoxy group |
| E-EA | Ethylene-ethyl acrylate copolymer (mole ratio = 90/10, Mw = 62,000, Mn = 29,000) | Ester group |
| St-AAM | Styrene-acrylamide copolymer (mole ratio = 97/3, Mw = 150,000, Mn = 72,000) | Amide group |
| St-OZN | Styrene-vinyloxazoline copolymer (mole ratio = 95/5, Mw = 78,000, Mn = 39,000) | Oxazoline group |
| St-IMZN | Styrene-vinylimidazoline copolymer (mole ratio = 95/2, Mw = 68,000, Mn = 33,000) | Imidazoline group |
| E-Cl | Chlorinated polyethylene (chlorine content: 10 wt %, Mw = 64,000, Mn 31,000) | Cl group |
| St-PhMI | Styrene-phenylmaleimide copolymer (mole ratio = 90/10, Mw = 180,000, Mn = 83,000) | Imido group |

TABLE 4

| Abbreviation | Resin name | Trade name | Manufacturer |
|---|---|---|---|
| | COMPONENT B | | |
| PP | Polypropylene | UP Polypro ME230 | Tokuyama Soda Co., Ltd. |
| PS | Polystyrene | Idemitsu styrol US300 | Idemitsu Sekiyu Kagaku Co., Ltd. |
| ABS | Acrylonitrile-butadiene-styrene copolymer | Toyorak 500 | Toray Industries, Inc. |
| PPE | Polyphenylene ether | Noryl N225J | Nippon G.E. Plastics Co., Ltd. |

These components A, B and C were used in the specified ratios shown in Table 5 and Table 6 to obtain thermoplastic resin compositions of Embodiments 1-15.

In Embodiments 1-8, Component (A-1) [Component (A-a) or Component (A-b)] was dry-blended with component C at the specified ratio and dried. Then the blend was melted and kneaded by a double screw extruder (KRC kneader, made by Kurimoto Tekkosho). Then the mixture was taken out and pelletized. Next, the specified quantity of component B was added to the mixture, and the resulting mixture was melted and kneaded again by the double screw extruder. The product was taken out and pelletized to obtain the thermoplastic resin composition.

In Embodiments 9-15, the resin of Component (A-2) was dry-blended with component C at the specified ratio and dried. Then the blend was melted and kneaded by the double screw extruder (KRC kneader, made by Kurimoto Tekkosho). Then the mixture was taken out and pelletized. Next, the specified quantity of component B was added to the mixture, and the resulting mixture was melted and kneaded again by the double screw extruder. The product was taken out and pelletized to obtain the thermoplastic resin composition.

The thermoplastic resin compositions thus obtained were processed by an injection molding machine (Hipershot 3000, made by Niigata Tekkosho) to obtain moldings. The moldings were examined in terms of Izod impact strength, presence or absence of interlaminar cleavage and appearance, and the results are listed in Table 5 and Table 6.

The methods for assessing the above-mentioned moldings were as follows: As for Izod impact strength, Izod impact value was measured according to JIS K-7110, at measuring temperatures of 23° C. and −30° C.

The presence or absence of interlaminar cleavage in the moldings was checked by the cross cut test. A knife was used to cut the surface of each test specimen to form grids of 100 squares of 1 mm × 1 mm. Then a piece of cellophane adhesive tape was pressed against the test piece. A strong force was applied to the cellophane tape to peel it off. Then the number of squares which did not stick to the cellophane tape and were not removed from the test piece was counted. The greater the number, the lower the tendency of interlaminar cleavage.

Regarding the appearance and hue of the moldings, the moldings were visually examined for flow mark, fuzz, silver streak and coloring. Moldings with good appearance are marked with ◯, those with a somewhat defective appearance are marked with Δ, and those with defective appearance are marked with X in Table 5 and Table 6.

COMPARATIVE EXAMPLES 1-15

In the respective embodiments 1-15, the mixtures to which component C (compatibilizing agent) was not added were used as comparative examples 1-15. The results are shown in Table 5 and Table 6.

TABLE 5

| | COMPOSITION OF THERMOPLASTIC RESIN COMPOSITION | | | | | | | | PHYSICAL PROPERTIES AND APPEARANCE | | | |
|---|---|---|---|---|---|---|---|---|---|---|---|---|
| | COMPONENT (A-1) | | | | COMPONENT B | | COMPONENT C | | IZOD IMPACT STRENGTH | | CLEAV-AGE | APPEARANCE |
| | (A-a) | | (A-b) | | | | | | | | | |
| | KIND | PART | KIND | PART | KIND | PART | KIND | PART | 23° C. | −30° C. | | |
| Embodiment 1 | PBT | 25 | — | | PP | 75 | Polymer (1) | 5 | 32.8 | 14.6 | 100/100 | ◯ |
| Embodiment 2 | PET | 70 | — | | PS | 30 | Polymer (6) | 10 | 28.2 | 13.8 | 100/100 | ◯ |
| Embodiment 3 | PC | 30 | — | | ABS | 70 | Polymer (7) | 5 | 48.2 | 29.4 | 100/100 | ◯ |
| Embodiment 4 | PA | 60 | — | | PPE | 40 | Polymer (8) | 5 | 32.1 | 19.0 | 100/100 | 0 |
| *Comp. Ex. 1 | PBT | 25 | — | | PP | 75 | — | | 2.9 | 1.6 | 21/100 | X |
| Comp. Ex. 2 | PET | 70 | — | | PS | 30 | — | | 4.8 | 1.9 | 18/100 | X |
| Comp. Ex. 3 | PC | 30 | — | | ABS | 70 | — | | 8.9 | 3.2 | 32/100 | X |
| Comp. Ex. 4 | PA | 60 | — | | PPE | 40 | — | | 4.1 | 1.8 | 16/100 | X |
| Embodiment 5 | — | | PP-MAH | 70 | ABS | 30 | Polymer (6) | 5 | 27.2 | 16.1 | 100/100 | ◯ |
| Embodiment 6 | — | | PA-COOH | 25 | PP | 75 | Polymer (3) | 2 | 31.2 | 17.8 | 100/100 | ◯ |
| Embodiment 7 | — | | E-GMA | 30 | PS | 70 | Polymer (7) | 3 | 20.1 | 11.0 | 100/100 | ◯ |
| Embodiment 8 | — | | E-EA | 75 | PPE | 25 | Polymer (8) | 5 | 26.4 | 15.0 | 100/100 | ◯ |
| Comp. Ex. 5 | — | | PP-MAH | 70 | ABS | 30 | — | | 2.5 | 1.1 | 7/100 | X |
| Comp. Ex. 6 | — | | PA-COOH | 25 | PP | 75 | — | | 4.3 | 1.9 | 20/100 | X |
| Comp. Ex. 7 | — | | E-GMA | 30 | PS | 70 | — | | 3.8 | 1.8 | 15/100 | X |
| Comp. Ex. 8 | — | | E-EA | 75 | PPE | 25 | — | | 5.1 | 2.8 | 12/100 | X |

NB: *Comparative Example

TABLE 6

| COMPOSITION OF THERMOPLASTIC RESIN COMPOSITION |
|---|
| COMPONENT (A-2) |

TABLE 6-continued

| | THERMOPLASTIC RESIN | | (A-a) | | (A-b) | | COMPONENT B | | COMPONENT C | |
|---|---|---|---|---|---|---|---|---|---|---|
| | KIND | PART | KIND | PART | KIND | PART | KIND | PART | KIND | PART |
| Embodiment 9 | PS | 75 | PC | 10 | — | | PP | 25 | Polymer (2) | 5 |
| Embodiment 10 | ABS | 60 | PC | 10 | — | | PPE | 40 | Polymer (7) | 5 |
| *Comp. Ex. 9 | PS | 75 | PC | 10 | — | | PP | 25 | — | |
| Comp. Ex. 10 | ABS | 60 | PC | 10 | — | | PPE | 40 | — | |
| Embodiment 11 | PPE | 30 | — | | St-AAM | 5 | PP | 70 | Polymer (1) | 5 |
| Embodiment 12 | PP | 30 | — | | St-OZN | 3 | PPE | 70 | Polymer (4) | 5 |
| Embodiment 13 | ABS | 25 | — | | St-IMZN | 5 | PP | 75 | Polymer (5) | 5 |
| Embodiment 14 | PP | 25 | — | | E-Cl | 10 | ABS | 75 | Polymer (7) | 5 |
| Embodiment 15 | PP | 70 | — | | St. PhMI | 10 | PS | 30 | Polymer (2) | 5 |
| Comp. Ex. 11 | PPE | 30 | — | | St. AAM | 5 | PP | 70 | — | |
| Comp. Ex. 12 | PP | 30 | — | | St. OZN | 3 | PPE | 70 | — | |
| Comp. Ex. 13 | ABS | 25 | — | | St. IMZN | 5 | PP | 75 | — | |
| Comp. Ex. 14 | PP | 25 | — | | E-Cl | 10 | ABS | 75 | — | |
| Comp. Ex. 15 | PP | 70 | — | | St.-PhMI | 10 | PS | 30 | — | |

| | PHYSICAL PROPERTIES AND APPEARANCE | | | |
|---|---|---|---|---|
| | IZOD IMPACT STRENGTH | | | |
| | 23° C. | −30° C. | CLEAVAGE | APPEARANCE |
| Embodiment 9 | 18.5 | 9.2 | 100/100 | ◯ |
| Embodiment 10 | 27.8 | 13.2 | 100/100 | ◯ |
| *Comp. Ex. 9 | 1.1 | 0.5 | 7/100 | X |
| Comp. Ex. 10 | 6.2 | 2.8 | 40/100 | Δ |
| Embodiment 11 | 29.1 | 14.0 | 100/100 | ◯ |
| Embodiment 12 | 26.1 | 11.0 | 100/100 | ◯ |
| Embodiment 13 | 31.5 | 15.8 | 100/100 | ◯ |
| Embodiment 14 | 35.3 | 18.2 | 100/100 | ◯ |
| Embodiment 15 | 20.0 | 11.0 | 100/100 | ◯ |
| Comp. Ex. 11 | 4.8 | 1.9 | 15/100 | X |
| Comp. Ex. 12 | 3.9 | 1.9 | 12/100 | X |
| Comp. Ex. 13 | 3.1 | 1.3 | 10/100 | X |
| Comp. Ex. 14 | 4.3 | 2.9 | 9/100 | X |
| Comp. Ex. 15 | 2.1 | 1.0 | 11/100 | X |

NB: *Comparative Example

As shown in Table 5 and Table 6, the impact strengths of the moldings of embodiments 1-15 were superior to the impact strengths of comparative Examples 1-15 at both measuring temperatures of 23° C. and −30° C. With regard to the interlaminar cleavage property of the moldings examined by the cross cut test, the values of the moldings of embodiments 1-15 were all 100/100 and no interlaminar cleavage was observed. In contrast, considerable interlaminar cleavages were caused in the moldings of comparative Examples 1-15. Moreover, the appearance of all the moldings of embodiments 1-15 was satisfactory, but the appearance of the moldings of comparative Examples 1-15 was defective.

(2) Copolymerization Type

Some embodiments which used copolymers having a formamide group (as component C compatibilizing agent) of thermoplastic resin compositions will be explained.

Polymer (9)

Copolymer Having Formamide Group 40 mL of purified n-heptane was loaded into an autoclave with an electromagnetic stirrer. The capacity of the autoclave was 200 mL and the autoclave had a catalyst chamber. The autoclave was cooled with ice. The air in the system of the autoclave was replaced with nitrogen, then 42.0 g (1 mole) of propylene and 4.25 g (0.05 mole) of N-allylformamide were loaded into the autoclave. The contents were heated up to 70° C., and the port of the catalyst chamber was opened to load 65 mg of titanium trichloride and 0.74 millimole of diethylaluminum chloride in the form of 5% n-heptane solution in the presence of a nitrogen stream. The port of the catalyst chamber was closed, the stirrer was operated, and nitrogen gas, having a pressure slightly higher than the internal pressure (about 19.5 kg/cm$^2$) of the reaction system, was injected for an instant to remove the Teflon cap at the lower end of the catalyst chamber and add the catalyst.

After one hour of polymerization at 70° C., the internal pressure dropped to 11.0 kg/cm$^2$. The autoclave was cooled, and the nonreacted monomer was purged. Then the contents were poured into 200 mL of methanol. White powder was obtained. This powder was filtered and washed with 100 mL of methanol and dried. 19.8 g of propylene-n-allylformamide copolymer [copolymer (9)] was obtained.

The infrared absorption spectrum of the above-mentioned copolymer was measured, and the strength of absorption by formamide at 1685 cm$^{-1}$ and the strength of absorption by propylene at 1450 cm$^{-1}$ were compared with each other to determine the composition of the copolymer; propylene/N-allylformamide=97.9/2.1 (mole/mole). The molecular weight of the copolymer was measured by GPC (gel permeation chromatography). The weight-average molecular weight (Mw) was 65,000 and the number-average molecular weight (Mn) was 31,500.

Polymers (10) and (11)

Other copolymers having a formamide group [copolymers (10) and (11)] were prepared by a method similar to that for polymer (9), and the results are shown in Table 7.

Table 7 shows the types, quantities and copolymerization conditions of the monomer raw materials. It also shows the yield, molecular weight and N-allylformamide content of the copolymers obtained.

including formamide by a method similar to that used to prepare polymer (12). The results are shown in Table 8. Table 8 shows the yield, molecular weight and formamide repeating unit content of the copolymers ob-

TABLE 7

| | COPOLYMER HAVING FORMAMIDE GROUP | | | | | | | |
|---|---|---|---|---|---|---|---|---|
| | Ethylene unsaturated monomer | | N-allylform- amide (g) | Polymerization conditions | | Copolymer obtained | | |
| | | | | Temp. (°C.) | Time (hr) | Yield (g) | N-allyl- formamide (mole %) | Mw | Mn |
| | Kind | Qty. (g) | | | | | | | |
| Polymer (9) | Propylene | 42.0 | 4.25 | 70 | 1 | 19.8 | 2.1 | 65,000 | 31,500 |
| Polymer (10) | Ethylene | 56.0 | 14.0 | 70 | 1 | 27.5 | 5.1 | 49,000 | 23,500 |
| Polymer (11) | Propylene | 42.0 | 12.8 | 70 | 1 | 22.3 | 8.1 | 38,000 | 17,800 | tained.

TABLE 8

| | COPOLYMERS HAVING FORMAMIDE GROUP | | | | | | | | | |
|---|---|---|---|---|---|---|---|---|---|---|
| | ETHYLENE UNSAT- URATED MONOMER | | FORMAMIDE COMPOUND | | RADICAL INITIATOR | | POLYMER- IZATION CONDITION | | COMPOLYMER OBTAINED | | |
| | | | | | | | | | FORMAMIDE REPEATING UNIT | | |
| | KIND | QTY. (g) | KIND | QTY. (g) | KIND | QTY. (g) | TEMP. (°C.) | TIME (hr) | YIELD (g) | CONTENT (MOLE %) | Mw | Mn |
| Polymer (12) | Hexene-1 | 336 | N-(1-methyl-2-propenyl)-formamide | 19.8 | AIBN | 5.5 | 60 | 10 | 285.1 | 4.0 | 25,000 | 11,000 |
| Polymer (13) | Octene-1 | 336 | N-ethyl-N-allyl-formamide | 7.0 | BPO | 5.0 | 80 | 9 | 291.2 | 1.9 | 32,000 | 15,000 |
| Polymer (14) | Styrene | 416 | N-methyl-N-(1-methyl-2-propenyl)-formamide | 3.0 | BPO | 5.5 | 80 | 10 | 354.0 | 0.4 | 53,000 | 24,000 |
| Polymer (15) | Styrene | 416 | N-methyl-N-allyl-formamide | 10.0 | BPO | 5.5 | 80 | 10 | 340.1 | 2.5 | 43,000 | 21,000 |
| Polymer (16) | Styrene | 416 | N-ethyl-N-(1-methyl-2-propenyl)-formamide | 8.0 | BPO | 5.5 | 80 | 10 | 362.9 | 1.4 | 38,000 | 16,000 |

Polymer (12)

Copolymer Having Formamide 5.5 g of azobisisobutyronitrile (AIBN) dissolved in 500 g of toluene was charged to a 2,000 mL flask which was provided with a cooler, a thermometer and a nitrogen feed tube. Then 336.0 g (4.0 moles) of hexene-1 and 19.8 g (0.2 mole) of N-(1-methyl-2-propenyl)formamide were charged, and the gas inside the flask was replaced with nitrogen. Then the mixture was heated at 60° C. for 10 hours and a viscous solution was obtained. The solution was mixed into 2,000 g of methanol, and the precipitated copolymer was filtered and dried.

The yield of the copolymer [copolymer (12)] was 285.1 g. The infrared absorption spectrum of the copolymer was measured. From the absorption at 1450 cm$^{-1}$ (due to hexene) and the absorption at 1685 cm$^{-1}$ (due to the amido group of N-(1-methyl-2-propenyl)formamide), the mole ratio of the hexene repeating unit to N-(1-methyl-2-propenyl)formamide group repeating unit was determined to be 96.0/4.0. The weight-average molecular weight (Mw) of the copolymer was 25,000 and the number-average molecular weight (Mn) was 11,000.

Polymers (13)–(16)

The ethylenic unsaturated monomers, formamide compounds and radical initators listed in Table 8 were used to prepare, under the polymerization conditions listed in Table 8, other copolymers [polymers (13)–(16)]

Embodiments 16–30

Component (A-a) for component A was provided by those listed in the above-mentioned Table 2. Component (A-b) for component A was provided by those listed in the above-mentioned Table 3. Component B was provided by those listed in the above-mentioned Table 4. Component C (copolymer) was provided by the above-mentioned polymers (9)–(16).

These components A, B and C were used at the specified ratios shown in Table 9 and Table 10, and the thermoplastic resin compositions of the embodiments 16–30 were obtained.

In the embodiments 16–23, Component (A-1) [Component (A-a) or Component (A-b)] and component C were dry-blended at the specified ratio and dried in advance. Then the mixture was melted and kneaded at 260° C. by a double screw extruder (KRC kneader, made by Kurimoto Tekkosho). The material was taken out and pelletized. Then, the specified quantity of component B was added to and mixed with the pellets, and the double shaft extruder was used again to melt and knead the mixture. The resulting mixture was taken out and pelletized to obtain the desired thermoplastic resin composition.

In the embodiments 24–30, the resin of Component (A-2) and component C were dry-blended at the specified ratio and dried in advance. Then the mixture was melted and kneaded at 260° C. by using a double shaft extruder (KRC kneader, made by Kurimoto Tekkosho). The material was taken out and pelletized. Then, the specified quantity of component B was added to and mixed with the pellets, and the double shaft extruder was used again to melt and knead the mixture. The resulting mixture was taken out and pelletized to obtain the desired thermoplastic resin composition.

The thermoplastic resin compositions thus obtained were processed by an injection molder (Hipershot 3000, made by Niigata Tekkosho) to produce moldings. The moldings were examined in terms of Izod impact strength, presence or absence of interlaminar cleavage and appearance. The results are shown in Table 9 and Table 10. The assessment of the above-mentioned moldings was made by methods similar to those used for the embodiments 1-15.

COMPARATIVE EXAMPLES 1-15

The cases in which the use of component C (compatibilizing agent) was omitted in the above-mentioned respective embodiments 16-30 were used as the comparative Examples 1-15, and the results are shown in Table 9 and Table 10.

TABLE 9

| | COMPOSITION OF THERMOPLASTIC RESIN COMPOSITION | | | | | | | | PHYSICAL PROPERTIES AND APPEARANCE | | | |
|---|---|---|---|---|---|---|---|---|---|---|---|---|
| | COMPONENT (A-1) | | | | COMPONENT B | | COMPONENT C | | IZOD IMPACT STRENGTH | | CLEAV- | AP-PEAR- |
| | (A-a) | | (A-b) | | | | | | | | | |
| | KIND | PART | KIND | PART | KIND | PART | KIND | PART | 23° C. | −30° C. | AGE | ANCE |
| Embodiment 16 | PBT | 25 | — | | PP | 75 | Polymer (9) | 5 | 34.7 | 16.9 | 100/100 | ○ |
| Embodiment 17 | PET | 70 | — | | PS | 30 | Polymer (14) | 10 | 31.2 | 14.2 | 100/100 | ○ |
| Embodiment 18 | PC | 30 | — | | ABS | 70 | Polymer (15) | 5 | 56.2 | 30.8 | 100/100 | ○ |
| Embodiment 19 | PA | 60 | — | | PPE | 40 | Polymer (16) | 5 | 27.4 | 12.1 | 100/100 | 0 |
| *Comp. Ex. 1 | PBT | 25 | — | | PP | 75 | — | | 2.9 | 1.6 | 21/100 | X |
| Comp. Ex. 2 | PET | 70 | — | | PS | 30 | — | | 4.8 | 1.9 | 18/100 | X |
| Comp. Ex. 3 | PC | 30 | — | | ABS | 70 | — | | 8.9 | 3.2 | 32/100 | X |
| Comp. Ex. 4 | PA | 60 | — | | PPE | 40 | — | | 4.1 | 1.8 | 16/100 | X |
| Embodiment 20 | — | | PP-MAH | 70 | ABS | 30 | Polymer (14) | 5 | 29.4 | 13.9 | 100/100 | ○ |
| Embodiment 21 | — | | PA-COOH | 25 | PP | 75 | Polymer (11) | 2 | 27.4 | 14.2 | 100/100 | ○ |
| Embodiment 22 | — | | E-GMA | 30 | PS | 70 | Polymer (15) | 3 | 21.1 | 11.1 | 100/100 | ○ |
| Embodiment 23 | — | | E-EA | 75 | PPE | 25 | Polymer (16) | 5 | 26.8 | 15.5 | 100/100 | ○ |
| Comp. Ex. 5 | — | | PP-MAH | 70 | ABS | 30 | — | | 2.5 | 1.1 | 7/100 | X |
| Comp. Ex. 6 | — | | PA-COOH | 25 | PP | 75 | — | | 4.3 | 1.9 | 20/100 | X |
| Comp. Ex. 7 | — | | E-GMA | 30 | PS | 70 | — | | 3.8 | 1.8 | 15/100 | X |
| Comp. Ex. 8 | — | | E-EA | 75 | PPE | 25 | — | | 5.1 | 2.8 | 12/100 | X |

NB: *Comparative Example

TABLE 10

| | COMPOSITION OF THERMOPLASTIC RESIN COMPOSITION | | | | | | | | | |
|---|---|---|---|---|---|---|---|---|---|---|
| | COMPONENT (A-2) | | | | | | | | | |
| | THERMO-PLASTIC RESIN | | (A-a) | | (A-b) | | COMPONENT B | | COMPONENT C | |
| | KIND | PART | KIND | PART | KIND | PART | KIND | PART | KIND | PART |
| Embodiment 24 | PS | 75 | PC | 10 | — | | PP | 25 | Polymer (10) | 5 |
| Embodiment 25 | ABS | 60 | PC | 10 | — | | PPE | 40 | Polymer (15) | 5 |
| *Comp. Ex. 9 | PS | 75 | PC | 10 | — | | PP | 25 | — | |
| Comp. Ex. 10 | ABS | 60 | PC | 10 | — | | PPE | 40 | — | |
| Embodiment 26 | PPE | 30 | — | | St-AAM | 5 | PP | 70 | Polymer (9) | 5 |
| Embodiment 27 | PP | 30 | — | | St-OZN | 3 | PPE | 70 | Polymer (12) | 5 |
| Embodiment 28 | ABS | 25 | — | | St-IMZN | 5 | PP | 75 | Polymer (13) | 5 |
| Embodiment 29 | PP | 25 | — | | E-Cl | 10 | ABS | 75 | Polymer (15) | 5 |
| Embodiment 30 | PP | 70 | — | | St. PhMI | 10 | PS | 30 | Polymer (10) | 5 |
| Comp. Ex. 11 | PPE | 30 | — | | St. AAM | 5 | PP | 70 | — | |
| Comp. Ex. 12 | PP | 30 | — | | St. OZN | 3 | PPE | 70 | — | |
| Comp. Ex. 13 | ABS | 25 | — | | St. IMZN | 5 | PP | 75 | — | |
| Comp. Ex. 14 | PP | 25 | — | | E-Cl | 10 | ABS | 75 | — | |
| Comp. Ex. 15 | PP | 70 | — | | St.-PhMI | 10 | PS | 30 | — | |

| | PHYSICAL PROPERTIES AND APPEARANCE | | | |
|---|---|---|---|---|
| | IZOD IMPACT STRENGTH | | | |
| | 23° C. | −30° C. | CLEAVAGE | APPEARANCE |
| Embodiment 24 | 19.2 | 10.1 | 100/100 | ○ |
| Embodiment 25 | 27.6 | 12.9 | 100/100 | ○ |
| *Comp. Ex. 9 | 1.1 | 0.5 | 7/100 | X |
| Comp. Ex. 10 | 6.2 | 2.8 | 40/100 | Δ |
| Embodiment 26 | 28.3 | 13.8 | 100/100 | ○ |

TABLE 10-continued

| | | | | |
|---|---|---|---|---|
| Embodiment 27 | 26.8 | 12.1 | 100/100 | ○ |
| Embodiment 28 | 33.1 | 14.3 | 100/100 | ○ |
| Embodiment 29 | 36.1 | 16.8 | 100/100 | ○ |
| Embodiment 30 | 21.0 | 11.9 | 100/100 | ○ |
| Comp. Ex. 11 | 4.8 | 1.9 | 15/100 | X |
| Comp. Ex. 12 | 3.9 | 1.9 | 12/100 | X |
| Comp. Ex. 13 | 3.1 | 1.3 | 10/100 | X |
| Comp. Ex. 14 | 4.3 | 2.9 | 9/100 | X |
| Comp. Ex. 15 | 2.1 | 1.0 | 11/100 | X |

NB: *Comparative Example

Table 9 and Table 10 show that the impact strengths of the moldings of the embodiments 16–30 are superior to those of the moldings of the corresponding comparative examples 1–15 at both temperatures of 23° C. and −30° C. As for the interlaminar cleavage of the moldings examined by the cross cut test, the values of the moldings of the embodiments 16–30 were 100/100 (no interlaminar cleavage occurred). On the other hand, the moldings of the comparative examples 1–15 showed considerable interlaminar cleavage. Moreover, the appearances of all the moldings of the embodiments 16–30 were satisfactory, whereas the appearances of the moldings of the comparative examples 1–15 were defective.

What is claimed is:

1. A thermoplastic resin composition including the following component A, component B and component C:
   (a) a polymer component having a functional group capable of reacting with an amino group;
   (b) a thermoplastic resin component that is essentially non-reactive with amino groups under conditions required for molding the resin composition; and
   (c) a graft copolymer obtained by a graft reaction of a thermoplastic polymer with a formamide compound (I) expressed by the following chemical formula:

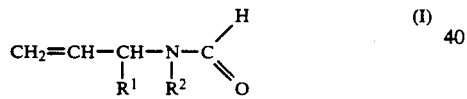

wherein, R$^1$ and R$^2$, the same or different, represent a hydrogen atom, an alkyl group with 1 to 8 carbon atoms, a cycloalkyl group with 6 to 10 carbon atoms, an aryl group with 6 to 10 carbon atoms, or an aralkyl group with 6 to 10 carbon atoms.

2. The thermoplastic resin composition of claim 1, wherein the thermoplastic resin component of component B includes one or more resins selected from the group consisting of a polyolefinic resin, a polystyrene resin, an ABS resin, a polyether resin, and mixtures thereof.

3. The thermoplastic resin composition of claim 1 or 2, wherein the polymer component of component A, that has a functional group capable of reacting with an amino group, is a resin selected from the group consisting of a polyester resin, a polycarbonate resin, a polyamide resin, and mixtures thereof.

4. The thermoplastic resin composition of claim 1 or 2, wherein the polymer component of component A, that has a functional group reactive with an amino group, contains one or more polymers having, in the molecule, a functional group selected from the group consisting of a succinic anhydride group, a carboxyl group, an epoxy group, an ester group, an amide group, a cyclic iminoether group, a cyclic iminoamine group, a halogen group, an imido group, and mixtures or combinations thereof.

5. A thermoplastic resin composition including a combination of the following component A, component B and component C:
   (A) a composition comprising a polymer component having a functional group capable of reacting with an amino group, and a thermoplastic resin that is essentially non-reactive with an amino group under conditions required for molding the resin composition, said non-reactive resin differing from the resin of component B;
   (B) a thermoplastic resin component that is essentially non-reactive with an amino group under the molding conditions; and
   (C) a graft copolymer obtained by a graft reaction of a thermoplastic polymer with a formamide compound (I) expressed by the following chemical formula:

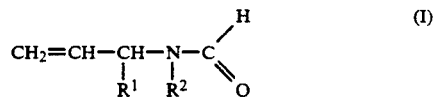

wherein, R$^1$ and R$^2$, the same or different, represent a hydrogen atom, an alkyl group with 1 to 8 carbon atoms, a cycloalkyl group with 6 to 10 carbon atoms, an aryl group with 6 to 10 carbon atoms, or an aralkyl group with 6 to 10 carbon atoms.

6. The thermoplastic resin composition of claim 5, wherein the thermoplastic resin component of component B is a resin selected from the group consisting of a polyolefinic resin, a polystyrene resin, an ABS resin, a polyether resin, and mixtures thereof.

7. The thermoplastic resin composition of claim 5 or 6, wherein the polymer component of said component A, having a functional group that is reactive with an amino group, includes a resin selected from the group consisting of a polyester resin, a polycarbonate resin, a polyamide resin, and mixtures thereof.

8. The thermoplastic resin composition of claim 5 or 6, wherein the polymer component of component A has a functional group that is reactive with an amino group, and comprises a polymer having, in the molecule, a functional group selected from the group consisting of a succinic anhydride group, a carboxyl group, an epoxy group, an ester group, an amide group, a cyclic iminoether group, a cyclic iminoamine group, a halogen group, an imido group, and mixtures thereof.

9. A thermoplastic resin composition including the following component A, component B and component C:
   (A) a polymer component having a functional group capable of reacting with an amino group;

(B) a thermoplastic resin component that is essentially non-reactive with an amino group under conditions required to mold the resin composition; and
(C) a copolymer including, in the molecule, a formamide constituent repeating unit (II) expressed by the following chemical formula, and a repeating unit of an ethylenic unsaturated monomer

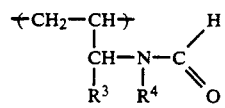  (II)

wherein $R^3$ and $R^4$, the same or different, represent a hydrogen atom, an alkyl group with 1 to 8 carbon atoms, a cycloalkyl group with 6 to 10 carbon atoms, an aryl group with 6 to 10 carbon atoms, or an aralkyl group with 6 to 10 carbon atoms.

10. The thermoplastic resin composition of claim 9, wherein the thermoplastic resin component of said component B includes one or more resins selected from the group consisting of a polyolefinic resin, a polystyrene resin, an ABS resin, a polyether resin, and mixtures thereof.

11. The thermoplastic resin composition of claim 9 or 10, wherein the polymer component of component A, having a functional group capable of reacting with an amino group, includes one or more resins selected from the group consisting of a polyester resin, a polycarbonate resin, a polyamide resin, and mixtures thereof.

12. The thermoplastic resin composition of claim 9 or 10, wherein the polymer component of component A, having a functional group capable reacting with an amino group, comprises one or more polymers having, in the molecule, a functional group selected from the group consisting of a succinic anhydride group, a carboxyl group, an epoxy group, an ester group, an amide group, a cyclic iminoether group, a cyclic iminoamino group, a halogen group, an imido group, and mixtures thereof.

13. A thermoplastic resin composition including the following component A, component B and component C:
(A) a composition comprising a polymer component having a functional group capable of reacting with an amino group, and a thermoplastic resin that is essentially non-reactive with an amino group under conditions required to mold the entire resin composition;
(B) a thermoplastic resin component that is different from the non-reactive resin of component A, and also is essentially non-reactive with an amino group under said molding conditions; and
(C) a copolymer including, in the molecule, a formamide constituent repeating unit (II) expressed by the following chemical formula, and a repeating unit of an ethylenic unsaturated monomer

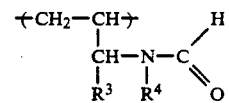  (II)

wherein $R^3$ and $R^4$, the same or different, represent a hydrogen atom, an alkyl group with 1 to 8 carbon atoms, a cycloalkyl group with 6 to 10 carbon atoms, an aryl group with 6 to 10 carbon atoms, or a aralkyl group with 6 to 10 carbon atoms.

14. The thermoplastic resin composition of claim 13, wherein the thermoplastic resin component of component B comprises one or more resins selected from the group consisting of a polyolefinic resin, a polystyrene resin, an ABS resin, a polyether resin, and mixtures thereof.

15. The thermoplastic resin composition of claim 13 or 14, wherein the polymer component of component A includes a functional group that is reactive with an amino group and includes one or more resins selected from the group consisting of a polyester resin, a polycarbonate resin, a polyamide resin, and mixtures thereof.

16. The thermoplastic resin composition of claim 13 or 14, wherein the polymer component of component A, having a functional group that is reactive with an amino group, comprises one or more polymers having, in the molecule, a functional group selected from the group consisting of a succinic anhydride group, a carboxyl group, an epoxy group, an ester group, an amide group, a cyclic iminoether group, a cyclic iminoamino group, a halogen group, an imido group, and mixtures thereof.

* * * * *

UNITED STATES PATENT AND TRADEMARK OFFICE
CERTIFICATE OF CORRECTION

PATENT NO. : 5,332,780
DATED : JULY 26, 1994
INVENTORS : KITAZAWA, ET AL.

It is certified that error appears in the above-identified patent and that said Letters Patent is hereby corrected as shown below:

Column 16, line 34, delete "PET" and substitute therefor -- PBT --.

Signed and Sealed this

Fifteenth Day of November, 1994

Attest:

BRUCE LEHMAN

*Attesting Officer*  *Commissioner of Patents and Trademarks*